(No Model.)
A. F. HILLMAN.
HAY SLING.
No. 263,782. Patented Sept. 5, 1882.
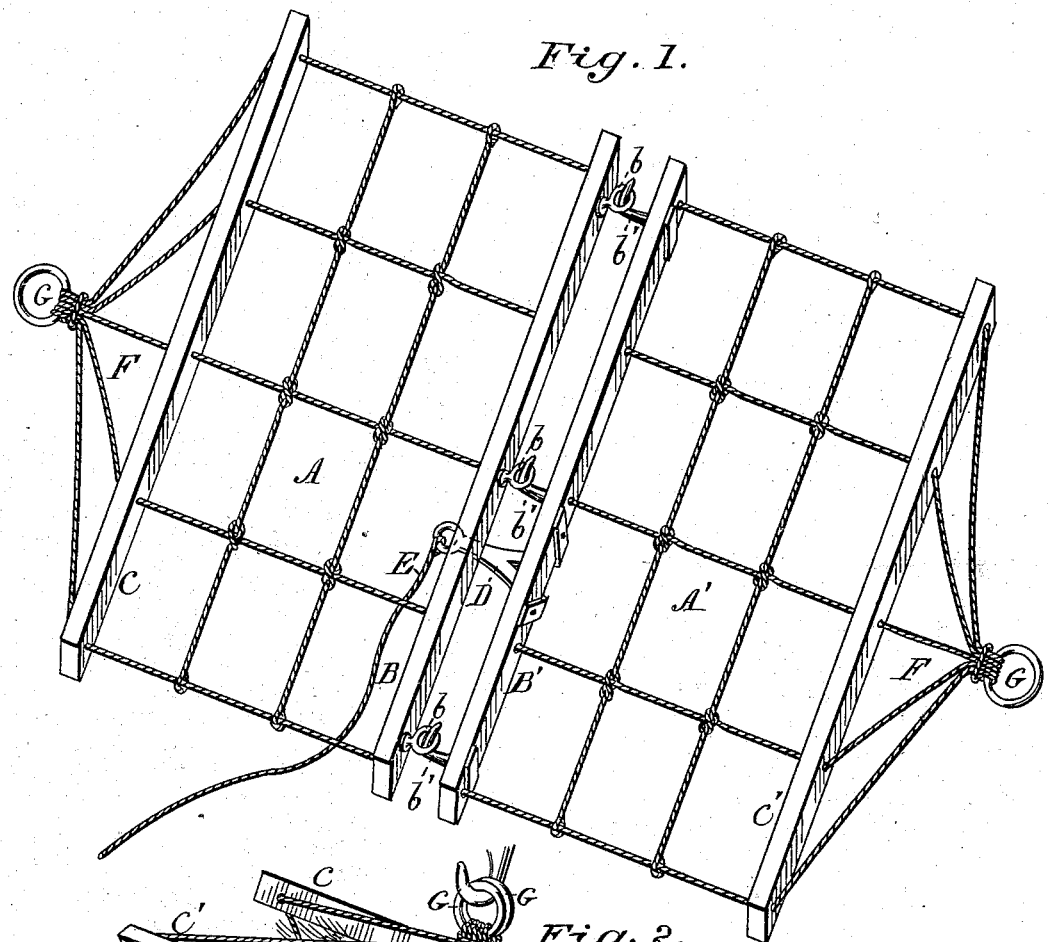
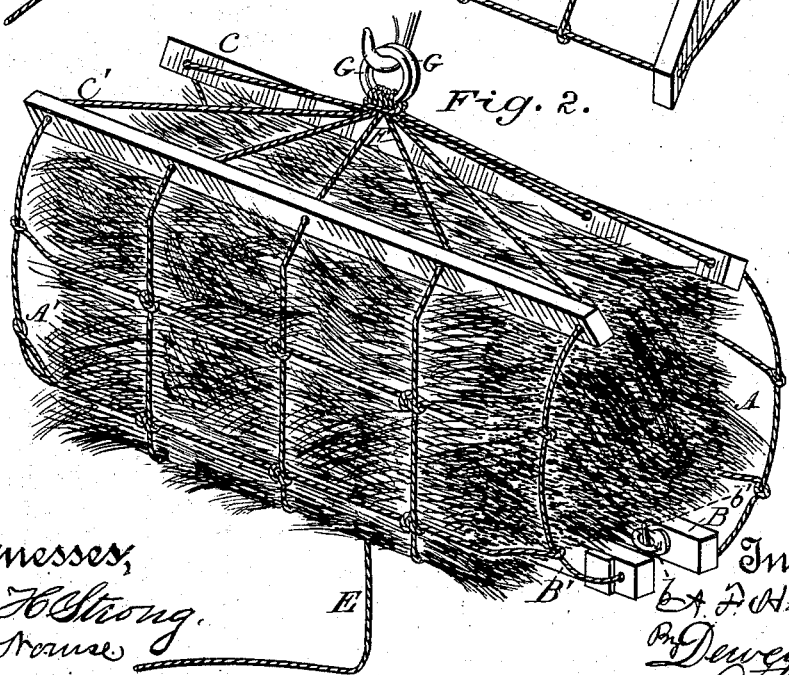

UNITED STATES PATENT OFFICE.

ALBERT F. HILLMAN, OF STOCKTON, CALIFORNIA.

HAY-SLING.

SPECIFICATION forming part of Letters Patent No. 263,782, dated September 5, 1882.

Application filed July 10, 1882. (No model.)

*To all whom it may concern:*

Be it known that I, ALBERT F. HILLMAN, of Stockton, county of San Joaquin, State of California, have invented an Improvement in Hay-Slings; and I do hereby declare the following to be a full, clear, and exact description thereof.

My invention relates to the class of hay-slings, and more particularly to an improvement in those in which a two-part or divided netting is coupled together and made to inclose the load, and which is disengaged at its center to discharge the load and free itself.

My improvement consists in the means for coupling the sections of the net, and in the means for disengaging them. The former consists in interlocking hooks and eyes attached to the inner or lower bars of the sections, and the latter consists in an arm or lever attached to the inner bar carrying the hooks, whereby it may be turned and the hooks disengaged from the eyes, as will be hereinafter more particularly explained.

The object of my invention is to provide a hay-sling which, when the load is in it, will safely retain it, and which will easily discharge it when ready, and at the same time free itself.

Referring to the accompanying drawings, Figure 1 is a perspective view of my hay-sling; Fig. 2, a perspective view showing hay-sling containing a load.

Let A A' represent a net divided into two sections, each of which is suitably provided with inner bars, B B', and exterior bars, C C'. The bar B is provided with eyes or staples $b$, set in at a slight upward inclination. The bar B' is provided with hooks $b'$, corresponding in position to staples $b$, and having their points project upwardly. From the under side of bar B' extends an arm or lever, D, to which a cord or rope, E, is attached. To the bars C C' above are secured the tackle-cords F, with their rings G, into which the hook of a derrick is adapted to be fitted.

The operation of my net is as follows: Section A' is first spread, with its hooks $b'$ projecting upwardly. Section A is then laid with its bar B adjoining bar B' and its eyes or staples $b$ fitting over the hooks $b'$, which thus engage said eyes from below. The load is then placed upon the nets, and the bars C C' are drawn up to inclose the sides. The rings G are hooked to the hoisting-power, and when the net is raised the weight within it and upon its lower bars, B B', keeps them engaged by its outward and downward strain. When elevated the cord E hangs down within reach of the operator at a safe distance, and when it has reached its place he pulls upon said cord, which, through the leverage of the arm D, easily turns downward bar B', by which movement its hooks $b'$ become disengaged from the eyes $b$ and the sections of net separate to discharge the load between them. By separating to the sides they free themselves entirely of the load, and may at once be lowered to repeat the operation.

By setting the eyes $b$ at a slight inclination the two bars B B' may be about on the same level, and have less tendency to unhook and prematurely discharge the load.

I am aware that divided nets are in use; but they are coupled and disengaged by devices unlike mine, and most of them require springs, latches, or locks.

I do not confine myself to the particular hooks and eyes here shown, but may use others equivalent in construction and operation.

Having thus described my invention, what I claim as new, and desire to secure by Letters Patent, is—

In a divided hay-sling, the net-section A, provided with a bar, B, carrying eyes $b\ b$, in combination with the net-section A', provided with a bar, B', hooks $b'$, and the projecting lever D, adapted to put a torsional strain on said bar B', as set forth.

In witness whereof I hereunto set my hand.

ALBERT F. HILLMAN.

Witnesses:
R. E. WILHOIT,
GEO. E. WILHOIT.